Figure 1:
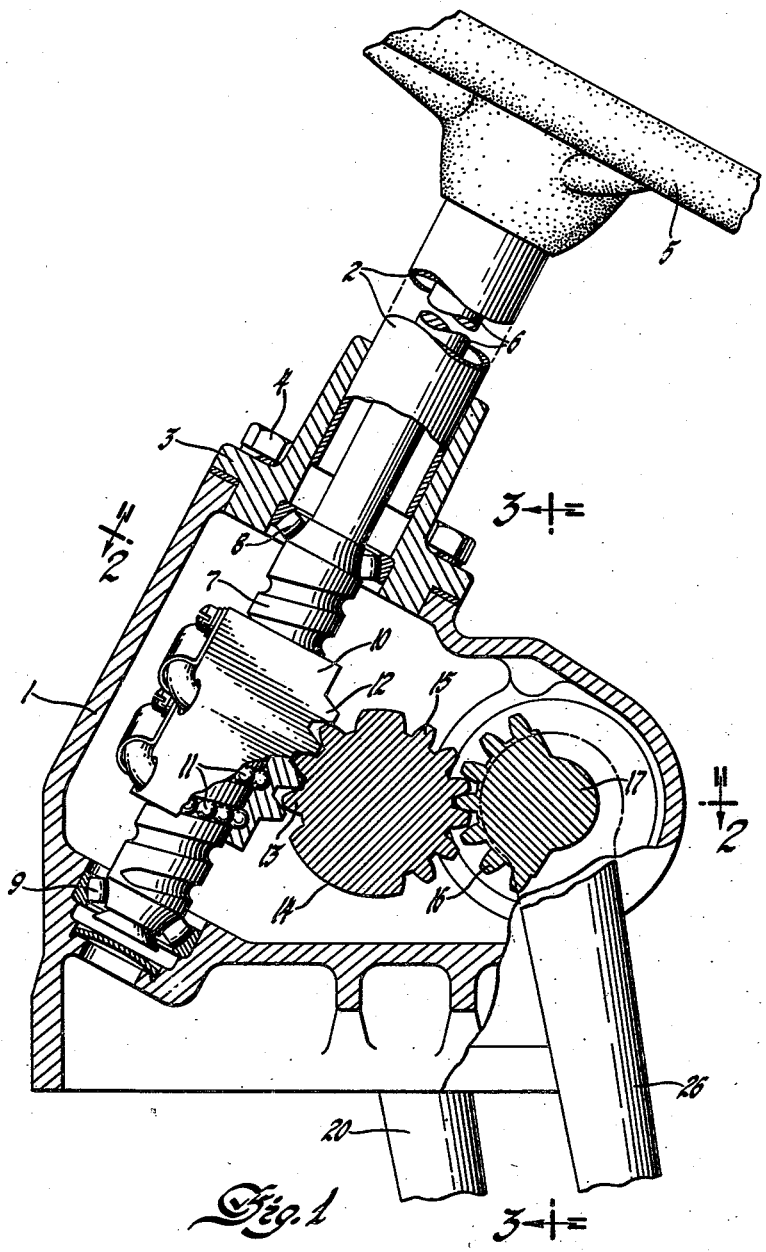

April 20, 1954     C. W. LINCOLN     2,675,715
STEERING GEAR

Filed March 25, 1950     2 Sheets-Sheet 1

Inventor
Clovis W. Lincoln
By Willits, Helwig & Baillio
Attorneys

April 20, 1954  C. W. LINCOLN  2,675,715
STEERING GEAR

Filed March 25, 1950  2 Sheets-Sheet 2

Inventor
Cloves W. Lincoln
By Willits, Helwig & Baillio
Attorneys

Patented Apr. 20, 1954

2,675,715

UNITED STATES PATENT OFFICE 2,675,715

STEERING GEAR

Clovis W. Lincoln, Saginaw, Mich., assignor to General Motors Corporation, Detroit, Mich., a corporation of Delaware Application March 25, 1950, Serial No. 151,855

5 Claims. (Cl. 74—498)

1

This invention relates to an improved steering gear for automotive vehicles, particularly the type of vehicle having a pair of dirigible ground wheels to be steered in unison from the same hand wheel but through separate drag links extending between the road wheel knuckles and the steering gear assembly. The double drag link arrangement is most often used with farm tractors having provision for changing the tread or transverse distance between the steerable wheels to fit ground furrows and plantings. In the steering operation each drag link travels in a direction opposite to the other and the motion transmitted to the push-pull links from the steering column is through pitman arms oscillating in directions counter to one another. Accordingly the two pitman arm shafts carry gears which mesh with each other for clockwise and counterclockwise rotation, respectively, and one of the gears is engaged by an actuating rack or a worm associated with the usual steering wheel shaft.

An object of the present invention is to provide a practical steering gear assembly which can be economically produced in quantity, assembled quickly and easily and set up simply both initially and after use for proper gear tooth engagement to insure a proper fit without play and back lash for maximum wear life and reduction of shock load on the parts.

A further object is to design a steering mechanism which utilizes to a large extent standard parts readily available without additional tooling costs, together with other parts which are free of complicated manufacturing problems requiring specialized technique and the whole affording a structure which will be trouble free in use and convenient to maintain and service.

In relation to the foregoing the novel subject matter includes the formation of bevel gears to intermesh in mating relation so that an axial adjustment of the rockshaft carrying the bevel teeth that engage with the rack teeth will effect the correct surface engagement and a similar axial adjustment of the remaining rockshaft, whose bevel teeth engage the bevel teeth of the first rockshaft, will result in correct surface engagement. Such axial adjustment of the two shafts independently can be accomplished from the exterior of the gear housing by screw studs having swivel connections with the ends of the respective shafts and threaded connection with the housing side walls, the ends of the studs projecting through the walls for ready accessibility.

In the preferred arrangement the rack engaged

2 rockshaft has bevel teeth arranged in two sets circumferentially spaced from one another so as to be on opposite sides of the shaft. One set meshes with the rack and the other set meshes with the other shaft and the tooth surfaces all converge in the same direction toward the shaft axis. This constitutes in effect a conical gear since the teeth could be cut throughout the entire circumference although for most uses a complete circular succession of teeth is not required for the limited range of travel called for. The inclination of the teeth in mesh with the inclined teeth of the rack and with the inclined teeth of the other rockshaft provides a cooperating relationship between the several gear elements and an arrangement of the two rockshafts and their respective adjustment studs on spaced apart substantially parallel axes and turned end for end so that one shaft carries its pitman arm on the right-hand side of the gear case and the other shaft carries its pitman arm on the left-hand side of the case each conveniently in position for attachment with a road wheel connecting drag link.

Figures 2, 3:
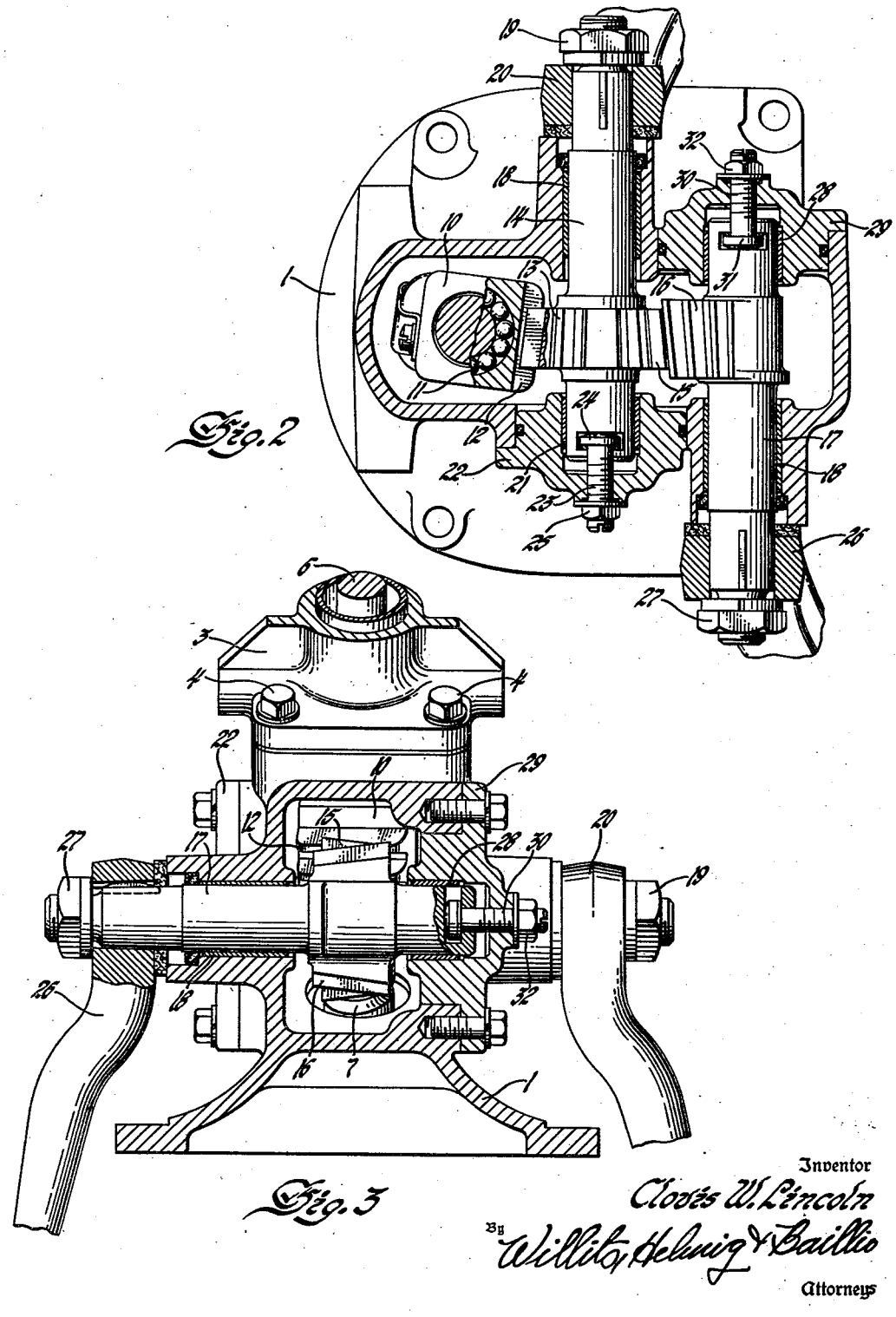

In the drawing Figure 1 is a vertical sectional view of the steering gear assembly and Figures 2 and 3 are transverse sections taken on lines 2—2 and 3—3, respectively, of Figure 1.

In the drawing the support for the several parts consists of the housing or case 1 whose lower end is formed for attachment on the tractor frame at the longitudinal center line of the vehicle. Extended upwardly and rearwardly from the case is a steering column including the hollow tube 2 whose lower end is press fitted into a tubular extension of a cap 3 secured by attachment bolts 4 over an opening in the top wall of the case. As usual the hand steering wheel 5 at the upper end of the tube 2 is keyed to a steering shaft 6 having a screw threaded lower end 7 mounted in bearings 8 nad 9. The lowermost bearing is supported within a pocket formed in the lower wall of the case 1 and the upper bearing 8 is received within a locating pocket in the removable cap 3. This arrangement makes for ease of application and removal of the steering column subassembly. A ball nut 10 of a well known conventional design surrounds the lower end 7 of the steering shaft and it has internal threads to cooperate with the threads on the shaft portion 7 in receiving the series of balls 11 through which the rotary movement of the shaft is converted to a linear travel of the nut 10.

On one side the nut 10 is in the form of a gear rack comprising a series of tapered teeth 12 which as viewed in Figure 2 extend in an inclined direction. These teeth 12 mate with and are in mesh with a series of tapered bevel teeth 13 preferably formed integral with a rockshaft 14. Circumferentially spaced from the teeth 13 is a second series of teeth 15, also formed integrally with the rockshaft 14. Optionally these two sets of bevel teeth may be formed separately from the rockshaft and, for example, may be in the nature of an independently formed bevel gear press fitted or otherwise fastened to the rockshaft. However, it is preferred to form the rockshaft at a proper location between opposite ends with an enlarged conical portion in which the several teeth are cut.

The inclined teeth 15 are shown in mating mesh engagement with a set of teeth 16 carried by a second rockshaft 17. It will be noted that the convergence of the teeth on respective rockshafts are in opposite directions and that except for the portions carrying the gear teeth the rockshafts are substantially alike. Thus the rockshaft 14 has a relatively long portion extending away from its gear and is mounted in a bearing 18 in a tubular boss in one of the side walls of the gear case 1. It terminates in a screw threaded end which receives a fastening nut 19 for holding a pitman arm 20 on a tapered extremity of the rockshaft and in fixed keyed relation thereto. Its opposite and shorter end is carried in a bearing 21 fitted to a removable cap 22 which is held by suitable attachment studs in an opening in the opposite wall of the case 1. This opening is sufficiently large to enable entry and removal of the rockshaft 14 and its enlarged gear portion. In axial alignment with the rockshaft 14 the cap 22 has a screw threaded opening in which is threaded an adjustable locator stud 23 whose head 24 is swivelly received within a transversely slotted end of the shaft 14. A jam nut 25 carried by the stud 23 for engagement with the end face of the cap 22 locks the stud in adjusted position. When the jam nut is loose the stud 23 may be rotated to thread in or out and axially shift the position of the rockshaft 14 for correctly bringing the teeth 12 and 13 into proper surface contact.

The rockshaft 17 has its longer end mounted in a bearing 18 and beyond the casing wall has keyed and attached thereto the pitman arm 26 held in place by the fastening nut 27. Its opposite and shorter end is rotatably supported in a bearing 28 by the removable cap piece 29 which threadedly receives the adjustable stud 30 whose head 31 is swiveled to the adjacent end of the rockshaft. Here again a jam nut 32 locks the parts against axial displacement and when loosened enables an axial adjustment of the stud 30 and with it the rockshaft 17 to locate and properly fit the teeth 16 with the bevel teeth 15.

Rotation of the hand wheel 5 operates to shift the actuator nut 10 whose rack teeth transmit steering wheel movement first to the rockshaft 14 and then through the gears 15 and 16 to the rockshaft 17. These two shafts being directly geared together will rotate in opposite directions so that when one of the pitman arms 20 and 26 moves clockwise the other moves counterclockwise and the movement is transmitted properly through the push-pull drive links to the dirigible ground wheels.

From the above description it will be apparent that there has been provided a relatively simple structure which can be produced at small cost and which by reason of the bevel tooth arrangement and the cooperative engagement of the several gear elements can be easily set up and maintained in proper surface engagement. The adjustment of the teeth may be easily and quickly effected without dismantling the parts and with ordinary hand tools by anyone of ordinary mechanical skill.

I claim:

1. In a double pitman arm steering gear, a housing, a rotatable steering shaft having its lower end extending within the housing( a steering shaft operable rack having tapered teeth, a first pitman shaft mounted in the housing and provided with two sets of tapered teeth arranged one set in circumferentially spaced relation to the other set and the teeth of one set being tapered similarly to the taper of the teeth of the other set, one of said sets of teeth mating with and being tapered in opposition to the tapered teeth of said rack, a second pitman shaft mounted in the housing and provided with a set of tapered teeth mating with and being tapered in opposition to the tapered teeth of the other set of teeth on the first pitman shaft, a first adjusting screw having swiveled connection with the first pitman shaft and threaded connection with one of the housing walls for axial adjustment of the pitman shaft to set its toothed engagement with the rack and a second screw adjustably threadedly engaged with an opposite housing wall and swivelly engaged with the second pitman shaft to shift it axially for setting its tapered tooth mesh with the mating teeth of the first pitman shaft.

2. In a double pitman arm steering gear, a pair of rockshafts having intermeshing conical gears with the gear tooth portions of larger diameter meshing with mating gear tooth portions of smaller diameter, an actuator having gear teeth mating with and in mesh with the teeth of a conical gear of one of said shafts and means for selectively adjusting said shafts axially thereof for setting the intermeshing engagement of teeth of said gears and actuator.

3. In a steering gear of the character described, a first rockshaft carrying a tapered tooth gear, an actuating rack having taper teeth in mating mesh engagement with said taper tooth gear, a second rockshaft carrying a taper tooth gear also in mating mesh with the first mentioned taper tooth gear, an adjustable device operatively connected for axially adjusting the tapered teeth of the gear carried by the first rockshaft in relation to the tapered teeth of said rack, and a second adjustable device operatively connected for axially adjusting the tapered teeth of the gear carried by the second rockshaft in relation to the tapered teeth of the gear carried by the first rockshaft.

4. A double pitman arm steering gear assembly including a gear housing, a pair of interengaged taper tooth gears mounted therein for operative connection with a pair of pitman arms, a taper tooth rack engaging one of said gears and a pair of slack take up members adjustably mounted in the housing and connected with said taper tooth gears respectively, the adjustment of said members locating said gears axially within the housing in proper mesh with each other and with the rack.

5. A steering gear assembly including supporting means, a tapered tooth rack carried thereby, a tapered tooth conical gear mounted by the support means in mesh with said rack, an adjustable locator in the supporting means for positioning said gear in relation to the rack, a tapered tooth gear mounted by the support means in mesh with said conical gear, an adjustable locator in the support means for positioning said tapered tooth gear in relation with the conical gear, and steerable members operatively connected with the gears, respectively.

References Cited in the file of this patent

UNITED STATES PATENTS

| Number | Name | Date |
|---|---|---|
| 814,586 | Cahen | Mar. 6, 1906 |
| 1,742,352 | Hunt | Jan. 7, 1930 |
| 2,169,336 | Best | Aug. 15, 1939 |
| 2,267,524 | Hawkins | Dec. 23, 1941 |
| 2,273,404 | Healey | Feb. 17, 1942 |
| 2,366,122 | Merce | Dec. 26, 1944 |

FOREIGN PATENTS

| Number | Country | Date |
|---|---|---|
| 951,845 | France | Nov. 4, 1949 |
| 625,498 | Great Britain | June 29, 1949 |